United States Patent [19]

Mowli et al.

[11] 4,174,597
[45] Nov. 20, 1979

[54] PROCESS FOR WRAPPING ARTICLES AND PROVIDING RECLOSABLE CONTAINER

[76] Inventors: John C. Mowli, 2032 W. jarvis, Chicago, Ill. 60645; Harry Bala, 2259 N. Kedzie, Chicago, Ill. 60647

[21] Appl. No.: 894,497

[22] Filed: Apr. 7, 1978

[51] Int. Cl.² .................. B65B 61/00; B65B 43/10
[52] U.S. Cl. ................................. 53/410; 53/455; 93/8 WA
[58] Field of Search ............... 53/410, 452, 455, 456; 93/8 WA

[56] References Cited

U.S. PATENT DOCUMENTS

| 3,807,118 | 4/1974 | Pike | 53/410 |
| 3,889,871 | 6/1975 | White | 93/8 WA X |

Primary Examiner—Travis S. McGehee
Attorney, Agent, or Firm—George H. Gerstman

[57] ABSTRACT

A process for wrapping articles and providing a reclosable plastic container is disclosed. A plastic sheet is conveyed in a feed direction and a stiff closure member is aligned with the plastic sheet substantially parallel to the feed direction. The article to be wrapped is fed into the plastic sheet and one side of the plastic sheet is folded over the article and alongside the closure member. The other side of the plastic sheet is folded alongside the closure member in the opposite direction so that portions of the plastic sheet alongside the closure member face each other. Portions of the platic sheet facing each other on opposite sides of the closure member are heat sealed so as to enclose the closure member within heat sealed portions of the plastic sheet. The overfolded plastic sheet is heat sealed and cut transversely to form the container.

13 Claims, 9 Drawing Figures

PROCESS FOR WRAPPING ARTICLES AND PROVIDING RECLOSABLE CONTAINER

BACKGROUND OF THE INVENTION

This invention relates to a novel process for wrapping articles and providing a reclosable plastic container, and to a novel reclosable plastic container.

It is an object of the present invention to provide a simple process for wrapping articles which uses a continuous feed, heat sealing, and a continuous closure strip without requiring use of a separate tape member for attaching the closure strip to the plastic sheet from which the container is made.

Another object of the present invention is to provide a process for wrapping articles in which a reclosable plastic container is constructed using a minimum number of steps and materials.

A further object of the present invention is to provide a process for manufacturing a reclosable plastic container using a longitudinal feed and heat sealing techniques, while at the same time applying a closure strip which is continuously fed to the plastic sheet from which the container is formed.

A still further object of the present invention is to provide a novel reclosable plastic container which is simple in construction and is easy to manufacture.

Other objects of the invention will become apparent as the description proceeds.

SUMMARY OF THE INVENTION

In accordance with the present invention, a process is provided for wrapping articles and for providing a reclosable plastic container. To this end, a plastic sheet is first conveyed in a feed direction and a stiff closure member is aligned with the plastic sheet substantially parallel to the feed direction. The article to be wrapped is fed into the plastic sheet and one side of the plastic sheet is folded over the article and alongside the closure member. The other side of the plastic sheet is folded alongside the closure member in the opposite direction so that the portions of the plastic sheet alongside the closure member face each other. The portions of the plastic sheet facing each other on opposite sides of the closure member are heat sealed so as to enclose the closure member within sealed portions of the plastic sheet. Thereafter, the overfolded plastic sheet is heat sealed and cut transversely.

In the illustrative embodiment, an opening is provided through the closure member is selected locations prior to cutting the overfolded plastic sheet transversely. In the illustrative embodiment, the enclosed closure member portion is also folded over a portion of the wrapped article prior to heat sealing and cutting the overfolded plastic sheet transversely.

In another illustrative embodiment of the invention, the plastic sheet is conveyed in a feed direction and a stiff closure member is aligned with the plastic sheet substantially parallel to the feed direction. One side of the plastic sheet is folded over the closure member and the overfolded portion of the plastic sheet is heat sealed on opposite sides of the closure member so as to enclose the closure member within sealed portions of the overfolded plastic sheet. An opening is provided through the closure member in selected locations and the overfolded, heat sealed portion enclosing the closure member is folded over again to close the opening to thus prevent communication between the inside of the container and the outside thereof. The article to be wrapped is fed into the plastic sheet and the opposite side of the plastic sheet is folded over the article to be wrapped, with the sheet thereafter being heat sealed and cut transversely.

In the illustrative embodiment just described, the second fold which closed the openings is also heat sealed and after the opposite side of the plastic sheet is folded over the article to be wrapped, the second fold which closed the openings is heat sealed again. The heat seals on opposite sides of the closure member are in the longitudinal feed direction.

The reclosable plastic container in accordance with the present invention comprises a plastic sheet folded to define one marginal edge and heat sealed on two marginal edges substantially perpendicular to the one marginal edge. A reclosable portion is provided on the front of the container and a closure strip is enclosed within the reclosable portion. The closure strip substantially extends from one of the heat sealed marginal edges to the other heat sealed marginal edge. A pair of substantially parallel heat seals on opposite sides of the closure strip are provided and the reclosable portion comprises the connected ends of the folded plastic sheet.

In one illustrative embodiment, the ends of the folded plastic sheet both lie in the front of the container, with the rear ply of the container being folded over to form a marginal edge opposite to one marginal edge. In another illustrative embodiment, only one end of the folded plastic sheet is overfolded to enclose the closure strip and is heat sealed to the other end of the folded plastic sheet at a marginal edge opposite the one marginal edge.

A more detailed explanation of the invention is provided in the following description and claims, and is illustrated in the accompanying drawings.

DETAILED DESCRIPTION OF THE ILLUSTRATIVE EMBODIMENT

Figure 1:
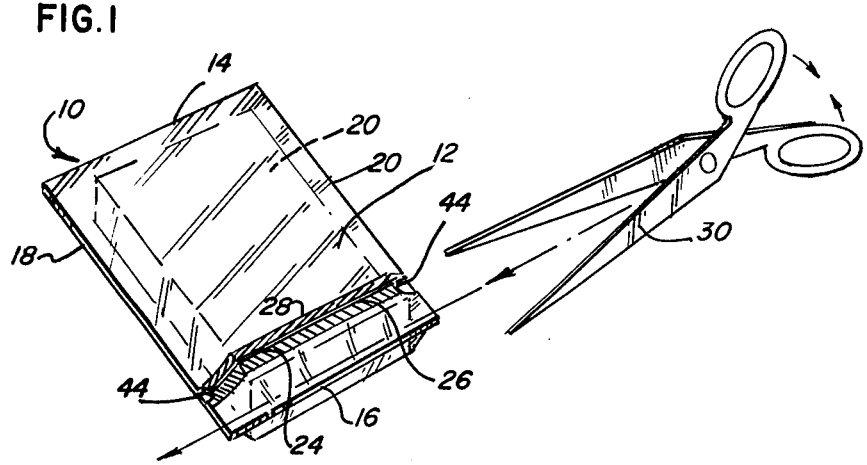
FIG. 1 is a perspective view of a reclosable plastic container constructed in accordance with the principles of the present invention.

Referring to FIG. 1, a plastic container 10 according to the present invention is shown therein. Container 10 is formed of polyethylene or any suitable thermoplastic material and comprises a front ply 12, a rear ply (not shown), a bottom marginal edge 14, a top are perpendicular to opposed edges 14 and 16.

The article 22 is enclosed within the container 10 and the container is sealed by means of a reclosable portion 24 which lies on the front of the container. Reclosable portion 24 includes a closure strip 26 which is enclosed within an overfolded portion 28 of the plastic sheet which forms container 10. Closure strip 26 may be formed of wire or any other material having the requisite rigidity so that once the closure strip 26 is bent, it will retain its bent shape.

It can be seen that the article 22 is spaced from edge 16 of the container. In order to remove article 22 from the container, a scissors 30 may be used to cut a line parallel to edge 16 as shown in FIG. 1. The container may be reclosed by folding reclosure portion 24 and its enclosed closure strip 26 over with the back ply of the container in a manner that will be apparent from the following description of the process and the container.

Figure 2:
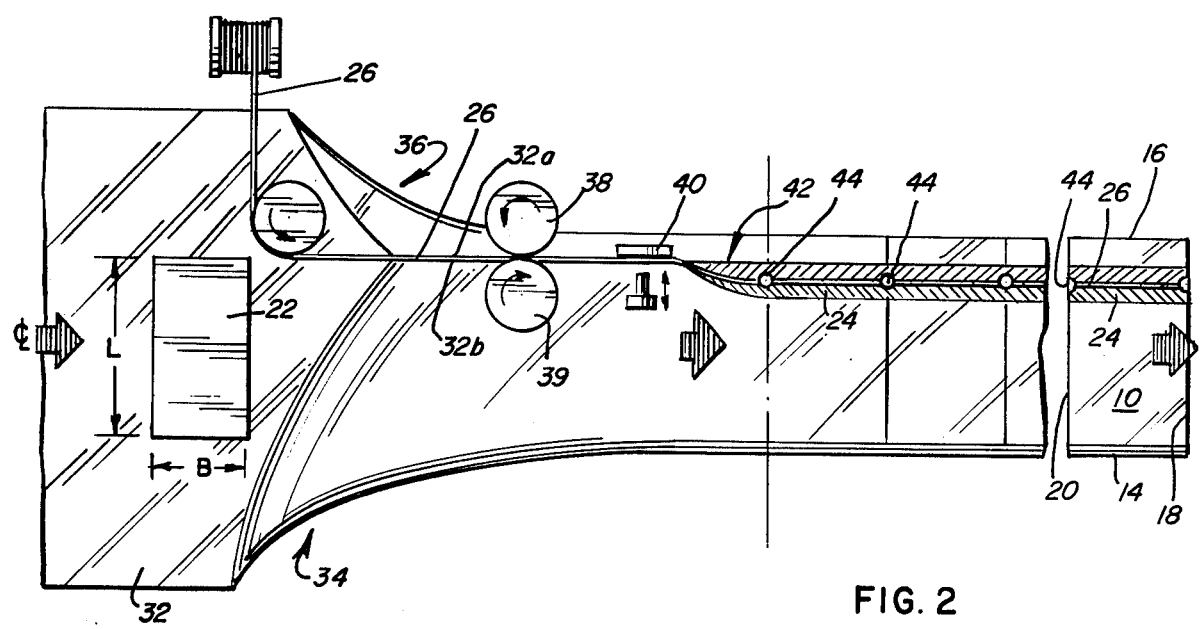
FIG. 2 is a plan view, in diagrammatic form, of a process for wrapping articles in accordance with the principles of the present invention.
Figure 3:
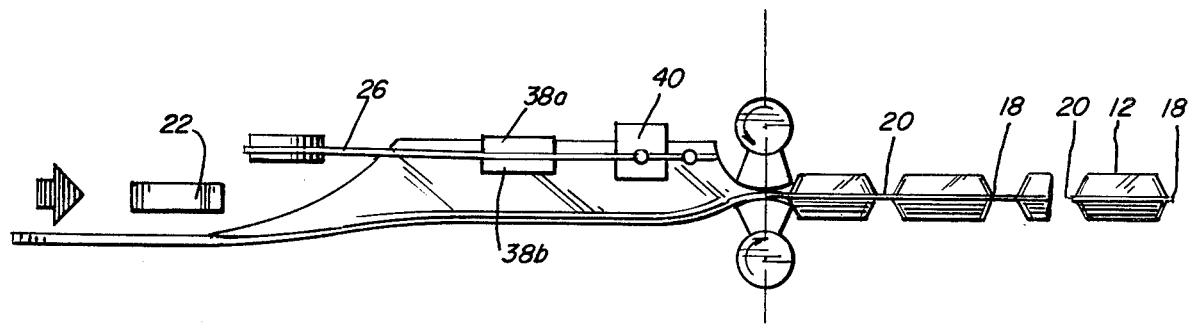
FIG. 3 is a side elevation thereof, in diagrammatic form.

Referring now to FIGS. 2 and 3, it can be seen that the article 22 is fed into an open sheet of thermoplastic film 32. A closure member 26 is aligned with sheet 32 adjacent one side thereof, and sheet 32 is folded at folding and wrapping station 34 over the article 22 and alongside the closure member 26, and the other side of the plastic sheet is folded at folding and wrapping station 36 alongside the closure member 26 in the opposite direction. In this manner, portions of the plastic sheet 32 alongside closure member 26 face each other. In other words, referring to FIG. 2, one end 32a of plastic sheet 32 faces the other end 32b of plastic sheet 32, with these ends 32a and 32b extending out of the paper toward the viewer when viewing FIG. 2.

A longitudinal heat seal is applied to the portions 32a and 32b of the plastic sheet 32 facing each other by means of heat seal rollers 38, 39. Referring to FIG. 3, it can be seen that heat seal roller 38 comprises a pair of axially spaced heat seal rollers 38a, 38b. Likewise, heat seal roller 39 comprises a pair of axially spaced heat seal rollers (not shown in FIG. 3). When the heat sealing is effected, longitudinal heat seals are applied to portions 32a and 32b on opposite sides of closure member 26.

Thereafter, the heat sealed film is fed past a punching station 40 and holes are punched at predetermined spacings through portions 32a, 32b and enclosed closure member 26, in order to enable transverse cutting and heat sealing of the plastic film at a subsequent step, without having to cut through the closure member.

The heat sealed and punched portions 32a, 32b are then conveyed to another folding station 42 wherein portion 24 which comprises portions 32a, 32b and the enclosed closure member, is folded to lie parallel with the major plane of the container. Thereafter, the item is conveyed to a heat seal and cut-off station, where a combination heat sealer-flying cut-off is utilized to heat seal and cut the overfolded plastic sheet transversely, as shown in FIGS. 2 and 3. It is preferred that the heat seal and cut-off be simultaneous and it can be seen that the cut is through the punched openings 44 so as to prevent engagement of the blade with the closure member.

It is preferred that the folding at folding and wrapping stations 34 and 36 be constructed so that only one side of the plastic sheet 32 will be folded over the article, and thus the reclosable portion 24 will not be aligned with the central axis of the product, but will instead be at an offset longitudinal line.

Figure 4:
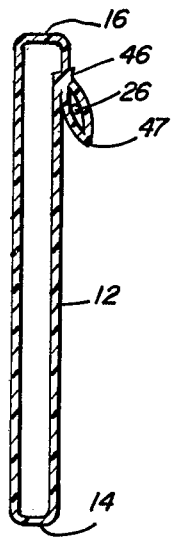
FIG. 4 is a diagrammatic view of a cross-section of a container constructed in accordance with the process of FIGS. 2 and 3.
Figure 5:
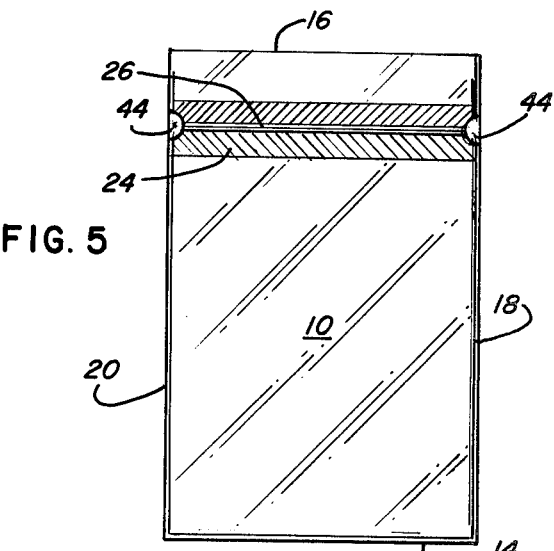
FIG. 5 is a front view, in diagrammatic form, of a container constructed in accordance with the process of FIGS. 2 and 3.

FIGS. 4 and 5 show the resulting product in which an upper heat seal 46 and a lower heat seal 47 is utilized to enclose the closure member 26 within a pocket that is formed as a result of the process, resulting in a reclosable portion 24.

Figure 6:
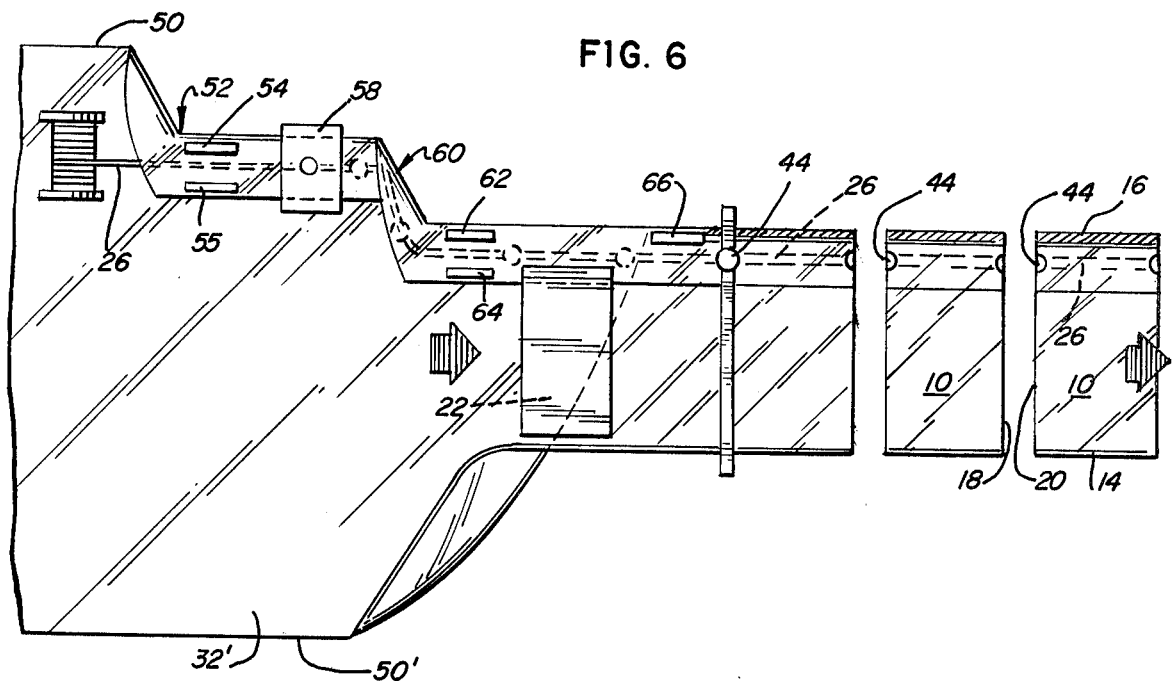
FIG. 6 is a plan view, in diagrammatic form, of a process for wrapping articles in accordance with another embodiment of the present invention.

In the embodiment of FIG. 6, the plastic film 32' is fed longitudinally and the closure member 26 is enclosed prior to capture of the article 22. To this end, the closure member 26 is fed adjacent one side 50 of sheet 32'. Side 50 is then folded over closure member 26 at a folding station 52 and longitudinal heat seals 54, 55 are applied on opposite sides of closure member 26, to fasten the overfolded end 50 to the sheet 32'. Holes 44 are punched at punching station 58 and the overfolded, heat sealed portion enclosing the closure member is folded once again at folding station 60 so as to close openings 44 and thus prevent communication between the inside of the container and the outside thereof. The article 22 to be wrapped is then fed into plastic sheet 32' and the opposite side 50' of plastic sheet 32' is folded over the article 22. Longitudinal heat seals 62, 64 are provided on opposite sides of the closure member 26 to seal the second overfolded portion to the sheet 32'.

After side 50' of sheet 32' is folded over article 22, another heat seal 66 is provided to fasten side 50' to the overfolded portion as shown in FIG. 6. As in the FIGS. 2–3 embodiment, a flying cut-off and heat sealer is then utilized to transversely heat seal and cut the folded sheet so as to form reclosable containers which contain article 22. The cutting blade is aligned with holes 44 so that it will not cut through closure member 26. It can be seen that the heated cut-off not only seals the sides of the bags, but is also effectively seals the overfolded portions along the sides.

Although in the FIG. 6 embodiment the side 50' has been shown as folded over the article 22 in the opposite direction as the wire enclosed folded portion, side 50' could be folded over the article 22 in the same direction as the closure member enclosed portion is folded over the article 22.

Figure 7:
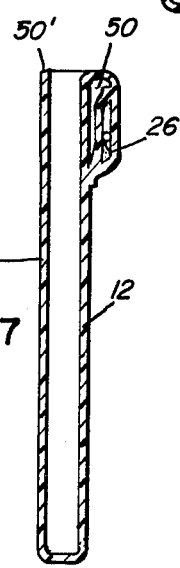
FIG. 7 is a diagrammatic corss-sectional view of a container formed using the process of FIG. 6, and prior to completion thereof.
Figure 8:
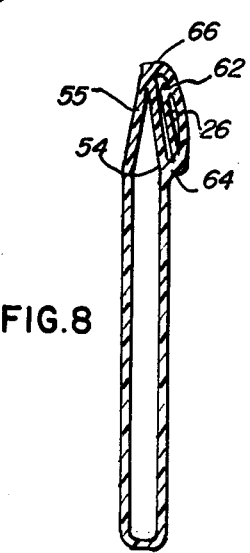
FIG. 8 is a diagrammatic cross-sectional view of a container formed in accordance with the process of FIG. 6.
Figure 9:
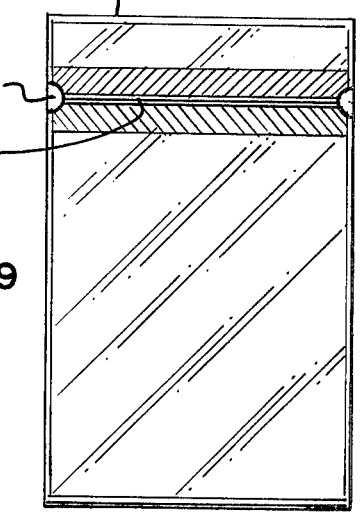
FIG. 9 is a diagrammatic front view of a container formed in accordance with the process of FIG. 6.

The product resulting from the process of FIG. 6 is illustrated in FIGS. 7-9. It is seen that closure member 26 is enclosed within a pocket defined by heat seals 54 and 55, while heat seals 62 and 64 are also utilized to seal the item, and heat seal 66 is used to connect the rear ply 70 of the container to front ply 12.

Thus a container has been provided in which communication between the inside of the container and the outside thereof is prevented, the container is simple to manufacture yet has the ability to be reclosed once opened, and the use of external tape members for fastening the closure member to the plastic film is not required.

Although two illustrative embodiments of the invention has been shown and described, it is to be understood that various modifications and substitutions may be made without departing from the novel spirit and scope of the present invention.

What is claimed is:

1. A process for wrapping articles and providing a reclosable plastic container which comprises the steps of:

conveying a plastic sheet in a feed direction;

aligning a closure member with the plastic sheet substantially parallel to the feed direction;

feeding the article to be wrapped into the plastic sheet;

folding one side of the plastic sheet over the article and alongside the closure member;

folding the other side of the plastic sheet alongside the closure member in the opposite direction so that the portions of the plastic sheet alongside the closure member face each other;

heat sealing the portions of the plastic sheet facing each other on opposite sides of the closure member so as to enclose the closure member within sealed portions of the plastic sheet; and heat sealing and cutting the overfolded plastic sheet transversely.

2. A process as claimed in claim 1, including the step of providing an opening through the closure member in selected locations prior to cutting the overfolded plastic sheet transversely.

3. A process as described in claim 1, wherein said closure member is a wire.

4. A process as described in claim 1, including the step of folding the enclosed closure member portion over a portion of the wrapped article prior to heat sealing and cutting the overfolded plastic sheet transversely.

5. A process for wrapping articles and providing a reclosable plastic container which comprises the steps of:

conveying a plastic sheet in a feed direction;

aligning a closure member with the plastic sheet substantially parallel to the feed direction;

feeding the article to be wrapped into the plastic sheet;

folding one side of the plastic sheet over the article and alongside the closure member;

folding the other side of the plastic sheet alongside the closure member in the opposite direction so that the portions of the plastic sheet folded alongside the closure member face each other;

thereafter heat sealing the portions of the plastic sheet facing each other on opposite sides of the closure member so as to enclose the closure member within sealed portions of the plastic sheet;

thereafter providing an opening through the closure member in selected locations;

thereafter folding the enclosed closure member portion over a portion of the wrapped article to seal the openings; and thereafter heat sealing and cutting the overfolded plastic sheet transversely.

6. A process as described in claim 5, wherein the steps of cutting the overfolded plastic sheet transversely and heat sealing the transversely cut portion of the overfolded plastic sheet are simultaneous.

7. A process for wrapping articles and providing a reclosable plastic container which comprises the steps of:

conveying a plastic sheet in a feed direction;

aligning a closure member with the plastic sheet substantially parallel to the feed direction;

folding one side of the plastic sheet over the closure member;

heat sealing the overfolded portion of the plastic sheet on opposite sides of the closure member so as to enclose the closure member within sealed portions of the overfolded plastic sheet;

providing an opening through the closure member in selected locations;

folding the overfolded, heat sealed portion enclosing the closure member over again to seal the openings and thus prevent communication between the inside of the container and the outside thereof;

feeding the article to be wrapped into the plastic sheet;

folding the opposite side of the plastic sheet over the article to be wrapped; and heat sealing and cutting the sheet transversely.

8. A process as described in claim 7, including the step of heat sealing the second fold which sealed the openings; and after the opposite side of the plastic sheet is folded over the article to be wrapped, heat sealing again the second fold which sealed the openings.

9. A process as described in claim 7, wherein said heat seals on opposite sides of the closure member are in the longitudinal feed direction.

10. A process as described in claim 7, including the step of heat sealing the second fold which sealed the openings on opposite sides of the closure member.

11. A process for wrapping articles and providing a reclosable plastic container which comprises the steps of:

conveying a plastic sheet in a feed direction;

aligning a closure member with the plastic sheet substantially parallel to the feed direction;

folding one side of the plastic sheet over the closure member;

heat sealing the overfolded portion of the plastic sheet on opposite sides of the closure member so as to enclose the closure member within sealed portions of the overfolded plastic sheet;

providing an opening through the closure member in selected locations;

folding the overfolded, heat sealed portion enclosing the closure member over again to seal said openings;

heat sealing the second fold which sealed the openings;

feeding the article to be wrapped into the plastic sheet;

folding the opposite side of the plastic sheet over the article to be wrapped;

thereafter heat sealing again the second fold which closed the openings; and heat sealing and cutting the plastic sheet transversely.

12. A process as described in claim 11, wherein the steps of cutting the plastic sheet transversely and heat sealing the transversely cut portion of the plastic sheet are simultaneous.

13. A process as described in claim 11, wherein said heat seals on opposite sides of the closure member are in the longitudinal feed direction.

* * * * *